United States Patent
Kimura et al.

(10) Patent No.: US 8,748,040 B2
(45) Date of Patent: Jun. 10, 2014

(54) NEGATIVE ELECTRODE ACTIVE MATERIAL FOR LITHIUM SECONDARY BATTERY AND NEGATIVE ELECTRODE FOR LITHIUM SECONDARY BATTERY

(75) Inventors: Yuta Kimura, Aichi (JP); Yuichiro Tago, Aichi (JP); Kenji Kodama, Aichi (JP); Satoshi Takemoto, Aichi (JP)

(73) Assignee: Daido Steel Co., Ltd., Nagoya, Aichi (JP)

( * ) Notice: Subject to any disclaimer, the term of this patent is extended or adjusted under 35 U.S.C. 154(b) by 169 days.

(21) Appl. No.: 13/200,653

(22) Filed: Sep. 28, 2011

(65) Prior Publication Data

US 2012/0082895 A1    Apr. 5, 2012

(30) Foreign Application Priority Data

Sep. 30, 2010 (JP) .................. 2010-220126
Aug. 10, 2011 (JP) .................. 2011-175430

(51) Int. Cl.
*H01M 4/13*    (2010.01)
*H01M 4/58*    (2010.01)

(52) U.S. Cl.
USPC ............... 429/221; 429/218.1; 252/182.1

(58) Field of Classification Search
None
See application file for complete search history.

(56) References Cited

FOREIGN PATENT DOCUMENTS

JP    2007-149604    *  6/2007    .............. H01M 4/02
JP    2009-32644 A    2/2009

OTHER PUBLICATIONS

Machine translation of JP 2007-149604, retrieved from <http://www19.ipdl.inpit.go.jp/PA1/cgi-bin/PA1DETAIL> on Jun. 28, 2013.*

* cited by examiner

*Primary Examiner* — Cynthia K. Walls
(74) *Attorney, Agent, or Firm* — McGinn IP Law Group, PLLC (57) ABSTRACT

A negative electrode active material for a lithium secondary battery, which includes a composition including Si in an amount of from 30% to 65% by mass of the negative electrode active material, includes a two phase matrix structure including an Sn—Cu based alloy matrix including an Sn content of 50% by mass or more of the Sn—Cu based alloy matrix, Si crystallites dispersed in the Sn—Cu based alloy matrix, and an Si—X based alloy crystallized so as to at least partially cover the Si crystallites, in which X is at least one element selected from Fe, Ni, and Co, and is added in an amount of 1% by mass or more of the negative electrode active material.

16 Claims, 2 Drawing Sheets

NEGATIVE ELECTRODE ACTIVE MATERIAL FOR LITHIUM SECONDARY BATTERY AND NEGATIVE ELECTRODE FOR LITHIUM SECONDARY BATTERY

FIELD OF THE INVENTION

The present invention relates to a negative electrode active material for a lithium battery and a negative electrode for a lithium secondary battery.

BACKGROUND OF THE INVENTION

A lithium secondary battery including a negative electrode using a carbon material such as graphite as a negative electrode active material, a positive electrode using a lithium-containing compound such as cobalt oxide, and a lithium salt such as $LiPF_6$ as an electrolyte interposed between those positive and negative electrodes has been conventionally known. In the lithium secondary battery, lithium ions are absorbed in a negative electrode active material during battery charge, and lithium ions are discharged from the negative electrode active material during battery discharge.

In recent years, a lithium secondary battery of this type draws attention as a power source of an electric vehicle. However, graphite, which is a negative electrode active material currently widely used, has theoretical capacity of only 372 mAh/g, and higher capacity has been desired. For this reason, recently metal materials such as Si and Sn that can be expected to have high capacity have been actively studied as an alternative material of a carbonaceous negative electrode active material.

However, Si and Sn cause large volume expansion and contraction with absorption and release of lithium ions. The expansion and contraction stresses gave rise a problem that particles of Si and Sn break or separate from a collector, and cycle characteristics that are capacity retention characteristics when repeating charge-discharge are deteriorated.

As the countermeasure, Patent Document 1 describes that a negative electrode active material having a structure that a lot of Si nuclei are surrounded by an Al—Co based alloy matrix can relax expansion-contraction stress, thereby improving the cycle characteristics.

Patent Document 1: JP-A-2009-32644

However, the conventional technology had room for further improvement in the following points. That is, in the negative electrode active material having a structure that Si nuclei are surrounded by the Al—Co based alloy matrix, improvement in the cycle characteristics is observed, but it was difficult to enhance the utilization rate of an active material.

An Al alloy has a few Li activity, but it cannot say that the Al alloy sufficiently plays a function as an Li diffusion path, and the utilization rate of an active material to the theoretical capacity thereof (=initial discharged capacity/theoretical capacity of active material×100) is decreased. The phenomenon of this type may occur even in the case that Cu is selected as a matrix.

SUMMARY OF THE INVENTION

The present invention has been made in view of the above circumstances, and an object of the present invention is to provide a negative electrode active material for a lithium secondary battery, capable of achieving both improvement in the utilization rate of an active material to the theoretical capacity thereof and improvement in cycle characteristics, and a negative electrode for a lithium secondary battery using the same.

In order to attain the above-mentioned object, the present invention provides a negative electrode active material for a lithium secondary battery, which has a composition containing Si in an amount of from 30 to 65% by mass and has a two phase matrix structure comprising an Sn—Cu based alloy matrix having an Sn content of 50% by mass or more, Si crystallites dispersed in the Sn—Cu based alloy matrix and an Si—X based alloy crystallized so as to at least partially cover the Si crystallites, wherein X is at least one element selected from Fe, Ni and Co and is added in an amount of 1% by mass or more of the negative electrode active material.

In the negative electrode active material for a lithium secondary battery, it is preferable that the Si—X based alloy covers the Si crystallites at a covering rate of 25% or more.

In addition, in the negative electrode active material for a lithium secondary battery, the amount of the X added is preferably from 3 to 15% by mass of the negative electrode active material.

It is preferable that the negative electrode active material for a lithium secondary battery is produced by a liquid quenching method.

The present invention also provides a negative electrode for a lithium battery comprising the above-mentioned negative electrode active material for a lithium secondary battery.

In the negative electrode active material for a lithium secondary battery according to the present invention, Si crystallites are dispersed in an Sn—Cu based alloy matrix. This constitution can achieve both the improvement in the utilization rate of an active material to the theoretical capacity thereof and the improvement in the cycle characteristics. This is presumed to be due to the following reasons.

An Al based alloy and Cu do scarcely absorb Li. Therefore, in the case that they are used in an alloy matrix surrounding Si crystallites, diffusion paths of Li in the alloy matrix are decreased. As a result, a material to be reacted with Li is mainly Si present on the surface of a powder, and Si unreacted with Li generates in the inside of the powder, resulting in decrease in the utilization rate of an active material.

On the other hand, although the capacity is low, an Sn—Cu based alloy absorbs Li. Therefore, when the Sn—Cu based alloy is used in an alloy matrix surrounding Si crystallites, it becomes easy to secure diffusion paths of Li in the alloy matrix. Therefore, the negative electrode active material for a lithium battery according to the present invention makes it possible to improve the utilization rate of an active material to the theoretical capacity thereof.

An Al based alloy and elemental Cu scarcely absorb Li. Therefore, in case that they are used in an alloy matrix surrounding Si crystallites, expansion of the matrix itself is small. For this reason, the matrix does not withstand expansion stress of Si and collapses, which makes it difficult to further improve the cycle characteristics. On the other hand, although the capacity is low, the Sn—Cu based alloy absorbs Li and thus the matrix itself also expands slightly. For this reason, when the Sn—Cu based alloy is used in an alloy matrix surrounding Si crystallites, the alloy expands simultaneously with Si, which makes it easy to relax expansion stress of Si and makes it easy to control the collapse. Therefore, the negative electrode active material for a lithium secondary battery according to the present invention makes it possible to improve the cycle characteristics.

Herein, when the Sn amount in the Sn—Cu based alloy matrix is 50% by mass or more, the above effect is particularly high.

In addition, when an Si—X based alloy (wherein X represents at least one element selected from Fe, Ni and Co) crystallizes in a state of at least partially covering the Si crystallites, collapse of Si can be inhibited by the Si—X based alloy in addition to the collapse of the Sn—Cu based alloy matrix around the Si crystallites, so that the cycle characteristics can further be improved.

It is presumed that the reason that further improvement of the cycle characteristics is obtained by the crystallization of the Si—X based alloy in the state of at least partially covering the Si crystallites in the Sn—Cu based alloy matrix is as follows.

The Si—X based alloy is a phase which scarcely absorbs Li, and the Si—X based alloy partially covering the Si crystallites inhibits the expansion of Si crystallites.

It is considered that the collapse of Si is effectively inhibited by the inhibition action of expansion of Si crystallites by the Si—X based alloy and also the relaxation action of expansion stress of Si crystallites by the Sn—Cu based alloy matrix, whereby the cycle characteristics can be further improved.

The negative electrode active material for a lithium secondary battery of the present invention has a composition containing 30% by mass or more of Si. This composition can secure large initial discharged capacity of an active material.

On the other hand, negative electrode active material for a lithium secondary battery of the present invention has a composition containing 65% by mass or less of Si. When the Si content is larger than 65% by mass, the matrix amount is decreased according to the increase in the Si content, and improvement effect of the cycle characteristics by the action of the matrix is decreased.

For these reasons, according to the invention, Si is contained in the active material in an amount of from 30 to 65% by mass.

In the negative electrode active material for a lithium secondary battery of the present invention, it is preferable that the covering rate of the Si crystallites by the Si—X based alloy is 25% or more, because this enables exhibiting the effect owing to the Si—X based alloy sufficiently to increase the cycle characteristics.

In this case, when the amount of X added is 3% or more in total, it becomes easy to obtain the covering rate of 25% or more.

On the other hand, when X is added in an amount exceeding 15%, the amount of Si present as a Si single phase may be decreased, and discharged capacity is decreased.

When the negative electrode active material for a lithium secondary battery is produced by a liquid quenching method, Si, an Si—X based alloy and an Sn—Cu based alloy are sequentially crystallized through melting by considering factors such as a melting point and a free energy. This makes it easy to form the above-described structure of a two-phase matrix where the Si—X based alloy and the Sn—Cu based alloy are present around the Si crystallites, which is a characteristic structure of the present invention.

The negative electrode for a lithium secondary battery according to the present invention employs the above-described negative electrode active material for a lithium secondary battery, and therefore can achieve both the improvement in the utilization rate of an active material to the theoretical capacity thereof and the improvement in the cycle characteristics.

BEST MODE FOR CARRYING OUT THE INVENTION

A negative electrode active material for a lithium secondary battery according to one embodiment of the present invention (hereinafter referred to as "the negative electrode active material") and a negative electrode for a lithium secondary battery using the negative electrode active material (hereinafter referred to as "the negative electrode") are described in detail below.

1. Negative Electrode Active Material Firstly, the constitution of the negative electrode active material is described.

The negative electrode active material is a material used in a negative electrode of a lithium secondary battery such as a lithium ion secondary battery or a lithium polymer secondary battery.

The negative electrode active material includes at least Si crystallites, an Sn—Cu based alloy matrix and an Si—X based alloy. The negative electrode active material has a structure in which a lot of Si crystallites are dispersed in the Sn—Cu based alloy matrix. Specifically, a lot of Si crystallites are surrounded by the circumferential Sn—Cu based alloy matrix.

In the negative electrode active material, the Si crystallites are a phase mainly containing Si. The Si crystallites is preferably composed of an Si single phase from the standpoint that lithium absorbing amount becomes large. Unavoidable impurities may be contained in the Si crystallites.

The shape of the Si crystallite is not particularly limited. The contour may be relatively uniform, and may be irregular. Furthermore, the individual Si crystallites may be isolated, and may be partially connected with each other.

Regarding the size of the Si crystallite, the upper limit thereof is preferably 1 µm or less, more preferably 700 nm or less, and further preferably 300 nm or less. Size refinement of Si makes it easy to reduce breakage of Si, and makes it easy to contribute to the improvement in the cycle characteristics.

The Si crystallites are better with decreasing the size. Therefore, the lower limit of the size of the Si crystallite is not particularly limited. However, the lower limit thereof is preferably 50 nm or more from the standpoint of, for example, decrease in capacity by oxidation of Si.

The size of the Si crystallites is an average value of sizes of Si crystallites obtained by measuring 20 pieces of Si crystallites optionally selected from a microstructure photograph (one visual field) of the negative electrode active material.

The negative electrode active material contains Si in an amount of from 30 to 65% by mass, and preferably from 40 to 50% by mass.

When Si is contained in an amount of 30% or more, it becomes easy to achieve discharged capacity of 800 mAh/g or more, which is a target value of initial discharged capacity. Furthermore, when Si is contained in an amount of 40% or more, it becomes easy to achieve discharge capacity of 1,100 mAh/g or more, which is a further desired discharged capacity.

On the other hand, the Sn—Cu based alloy matrix is contained in an amount of preferably from 20 to 69% by mass, and more preferably from 35 to 57% by mass. Where the Si content is extremely low, capacity of a negative electrode active material is decreased, and the meaning as an alternative material of graphite becomes small. On the other hand, where the Si content is extremely large, the amount of the Sn—Cu based alloy matrix is relatively decreased, and the effect of inhibiting expansion-contraction of Si crystallites is decreased. When the contents of Si and the Sn—Cu based alloy matrix are in the above ranges, the balance between improvement effect of the cycle characteristics and high capacity is excellent.

In the negative electrode active material, the Sn—Cu based alloy constituting the matrix has Li activity and contains Cu as a first sub-element. The term "having Li activity" means that even an Sn—Cu based alloy solely reacts Li to form an Li compound. In the present invention, lithium is easy to reach Si crystallites in the inside of the matrix since the Sn—Cu based alloy constituting the matrix has Li activity. Furthermore, Li activity of the Sn—Cu based alloy is smaller than Li activity of Si. Therefore, the Sn—Cu based alloy appropriately expands although not expansion as in Si, which makes it easy to inhibit the collapse.

The Sn—Cu based alloy may further contain at least one of sub-elements other than Cu. In addition, the Sn—Cu based alloy may contain unavoidable impurities. Examples of the sub-element other than Cu include Group 2A elements, transition elements, Group 3B elements and Group 4B elements in a long-period periodic table. Those sub-elements may be contained alone or as mixtures of two or more thereof. Specific examples of the Sn—Cu based alloy include Sn—Cu alloy (binary system), and Sn—Cu—Al, Sn—Cu—In, Sn—Cu—Sb, Sn—Cu—Zn, Sn—Cu—Mn and Sn—Cu—Mo alloys (ternary system). Of those, Sn—Cu alloy (binary system) or Sn—Cu—Al alloy (ternary system) is preferred from the standpoints of appropriate Li activity and expansion, easy relaxation of expansion stress of Si, conductivity and the like. Sn element may be contained alone in the alloy constituting those matrixes.

The Sn—Cu based alloy matrix is required to contain Sn in an amount of 50% by mass or more, preferably 55% by mass or more, and more preferably 60% by mass or more. This is because, such content makes it easy to contribute to the improvement in the utilization rate of an active material to the theoretical capacity and the improvement in stability of a negative electrode active material. On the other hand, when the Sn content exceeds 95% by mass, the effect of improving characteristics tends to be rather decreased. For this reason, the Sn—Cu based alloy matrix preferably contains Sn in an amount of 95% by mass or less.

In the negative electrode active material, the Si—X based alloy is crystallized in a state of at least partially covering the Si crystallites. Crystallizing the Si—X based alloy makes it possible to inhibit the collapse of Si by the Si—X based alloy in addition to the collapse of the Sn—Cu based alloy matrix around the Si crystallites, and can further improve the cycle characteristics.

In the present invention, X, which is an element constituting the Si—X based alloy, is preferably a transition metal element such as Fe, Ni or Co from the standpoints that the Si—X based alloy is easily formed around the Si crystallites and the effect of inhibiting the collapse of Si is large.

These elements may be contained alone or as mixtures of two or more thereof. Of those, Fe can particularly preferably be selected from the standpoint that Fe can contribute to the reduction in cost of a negative electrode active material. The Si—X based alloy may contain unavoidable impurities.

In the present invention, X is added in an amount of 1% by mass or more in the sense of securing the effect of inhibiting the collapse of Si particles by the Si—X based alloy.

The covering rate of the Si crystallites with the Si—X based alloy is desirably 25% or more. Where the covering rate is smaller than 25%, it is difficult to obtain the sufficient effect of inhibiting the collapse of Si particles by the Si—X based alloy.

On the other hand, when the covering rate is excessively high, the utilization rate of Si is decreased, resulting in decrease in capacity. Therefore, the covering rate is desirably 95% or less.

In this case, X, which is an element constituting the Si—X based alloy, is contained in an amount of preferably from 3 to 15% by mass. When the content of X is small, it is difficult to obtain the above-mentioned desired covering rate, and the effect of inhibiting the collapse of Si particles by the Si—X based alloy is difficult to be exhibited, resulting in decrease in the cycle characteristics. On the other hand, when the content of the Si—X based alloy is excessively large, the amount of the Si crystallites is relatively decreased, and the area of the exposed area of the Si crystallites from the Si—X based alloy is relatively decreased. As a result, the utilization rate of Si is decreased, resulting in decrease in capacity. When the content of X is within the above range, the balance between the effect of improving the cycle characteristics and high capacity is excellent.

The form of the negative electrode active material is not particularly limited. Specific examples of the form thereof include a flake form and a powder form. A powder form is preferred from the standpoint of easy application to the production of a negative electrode. The negative electrode active material may be dispersed in an appropriate solvent.

Regarding the size of the negative electrode active material, the upper limit thereof is preferably 75 μm or less, more preferably 50 μm or less, and further preferably 25 μm or less. When the particle diameter is too large, Li is difficult to disperse in the inside of the active material, and the utilization rate of an active material to the theoretical capacity tends to be decreased. Furthermore, it is considered that Li diffusion path becomes long, and input-output characteristics are decreased.

On the other hand, regarding the size of the negative electrode active material, the lower limit thereof is preferably 100 nm or more, more preferably 500 nm or more, and further preferably 1 μm or more. When the particle diameter is too small, particles are easy to be oxidized, resulting in decrease in capacity and increase in irreversible capacity.

The size of the negative electrode active material can be measured with a laser diffraction/scattering type grain size distribution-measuring device.

Next, methods for producing the negative electrode active material are described below. The methods for producing the negative electrode active material include a method including a step of quenching a molten alloy containing at least Si, Sn, Cu and X (wherein X is at least one element selected from Fe, Ni and Co) to form a quenched alloy. In this case, the molten alloy can contain other additive elements as necessary.

In case that the quenched alloy obtained is not a powder form or is desired to have a small grain size, a step of pulverizing the quenched alloy with an appropriate pulverization means to form a powder may be added. In addition, as necessary, a step of subjecting the quenched alloy obtained to a classification treatment to control to an appropriate grain size may be added.

In the above production method, the molten alloy can specifically be obtained by, for example, weighing each raw material to achieve a given chemical composition, and melting each raw material weighed with a melting means such as an arc furnace, a high-frequency induction furnace or a heating furnace.

Specific examples of the method for quenching the molten alloy include liquid quenching methods such as a roll rapid quenching method (a single roll rapid quenching method, a twin roll rapid quenching method and the like), and an atomization method (a gas atomization method, a water atomization method, a centrifugal atomization method and the like). The gas atomization method can preferably be used from the standpoint of improvement in productivity. The maximum quenching rate of the molten alloy is preferably $10^3$ K/sec or more, and more preferably $10^6$ K/sec or more, from the standpoint easily obtaining the above-mentioned microstructure.

In the case of producing the negative electrode active material using a molten alloy containing at least Si, Sn, Cu and X, the following specific methods are preferably used.

In the case of applying the atomization method, a high pressure gas (for example, 1 to 10 MPa) such as $N_2$, Ar or He is jetted to a molten alloy introduced in a atomizing chamber and continuously (rod shape) fallen downward, and the molten alloy is cooled while pulverizing. The molten alloy cooled approaches a spherical shape while freely falling down in the atomizing chamber in the semi-molten state, and a powdery negative electrode active material is obtained. High pressure water may be jetted in place of a gas from the standpoint of improving the cooling effect.

In the case of applying the roll rapid quenching method, a molten alloy introduced in a chamber such as a quenching and recovering chamber and continuously (rod shape) fallen downward is cooled on a rotating roll (the material is Cu, Fe or the like, and the roll surface may be plated) rotating in a peripheral velocity of from about 10 m/sec to 100 m/sec. When the molten alloy is cooled on the roll surface, an alloy material in a form of a foil or a foil piece is obtained. In this case, the alloy material is pulverized by an appropriate pulverizing means such as ball mill, disk mill, coffee mil or mortar pulverization and optionally classified, whereby a powdery negative electrode active material is obtained.

2. Negative Electrode

The negative electrode is constituted using the negative electrode active material.

Specifically, the negative electrode includes a conductive substrate and a conductive film laminated on the surface of the conductive substrate. The conductive film employs a binder containing at least the above-mentioned negative electrode active material. The conductive film may further contain a conductive auxiliary agent as necessary. When the conductive film contains the conductive auxiliary agent, it becomes easier to obtain conductive paths of electrons.

The conductive film may contain an aggregate as necessary. In the case of containing the aggregate, expansion-contraction of the negative electrode during charge-discharge is easy to be inhibited, and the collapse of the negative electrode can be inhibited. As a result, the cycle characteristics can further be improved.

The conductive substrate acts as a collector. Examples of the material of the conductive substrate include Cu, Cu alloys, Ni, Ni alloys, Fe and Fe-based alloys. Of those, Cu and Cu alloys are preferred. The specific form of the conductive substrate is a foil shape and a plate shape. The foil shape is preferred from the standpoints that a volume as a battery can be decreased and the degree of freedom of the shape is improved.

Examples of the material of the binder that can preferably be used include a fluorine resin such as a polyvinylidene fluoride (PVdF) resin or polytetrafluoroethylene, a polyvinyl alcohol resin, a polyimide resin, a polyamide resin, a polyamideimide resin, a styrene-butadiene rubber (SBR) and a polyacrylic acid. Those can be used alone or as mixtures of two or more thereof. Of those, polyimide resin is preferred from the standpoint of stability in an electrochemical reaction and strength of binding force.

Examples of the conductive auxiliary agent include carbon black such as Ketjen black, acetylene black or furnace black, graphite, carbon nanotube and fullerene. Those may be used alone or as mixtures of two or more thereof. Of those, Ketjen black and acetylene black are preferably used from the standpoints that electron conductivity is easy to be secured.

The content of the conductive auxiliary agent is preferably from 0 to 30 parts by mass, and more preferably from 6 to 13 parts by mass, per 100 parts by mass of the negative electrode active material from the standpoints of improvement in conductivity and electrode capacity. The average particle diameter of the conductive auxiliary agent is preferably from 10 nm to 1 μm, and more preferably from 20 to 50 nm, from the standpoints of dispersibility and easy handling.

The aggregate can preferably use a material which does not expand and contract or has very small expansion and contraction during charge-discharge. Examples of the aggregate include graphite, alumina, calcia, zirconia and activated carbon. Those may be used alone or as mixtures of two or more thereof. Of those, graphite can preferably be used from the standpoints of conductivity and Li activity.

The content of the aggregate is preferably from 10 to 400 parts by mass, and more preferably from 43 to 100 parts by mass, per 100 parts by mass of the negative electrode active material from the standpoint of improvement in the cycle characteristics. The average particle diameter of the aggregate is preferably from 10 to 50 μm, and more preferably from 20 to 30 μm, from the standpoints of functionality as an aggregate and control of electrode film thickness. The average particle diameter of the aggregate is a value measured using a laser diffraction/scattering type grain size distribution-measuring device.

The negative electrode can be produced, for example, as follows. The negative electrode active material, and as necessary, a conductive auxiliary and an aggregate are added in necessary amounts to a binder dissolved in an appropriate solvent to form a paste, and the paste is applied to the surface of a conductive substrate, dried, and as necessary, subjected to consolidation or heat treatment.

In the case of constituting a lithium secondary battery using the negative electrode of the present invention, a positive electrode, an electrolyte, a separator and the like that are the basic constituent elements of a battery other than the negative electrode are not particularly limited.

Specific example of the positive electrode includes an electrode including a collector such as an aluminum foil, and a layer containing a positive electrode active material such as $LiCoO_2$, $LiNiO_2$, $LiFePO_4$ or $LiMnO_2$, formed on the surface of the collector.

Specific example of the electrolyte includes an electrolytic solution including a lithium salt dissolved in a non-aqueous solvent (lithium ion secondary battery). Other than this, an electrolytic solution including lithium salt dissolved in a polymer, and a polymer solid electrolyte including a polymer impregnated with the electrolytic solution can be used (lithium polymer secondary battery).

Specific examples of the non-aqueous solvent include ethylene carbonate, propylene carbonate, butylene carbonate, dimethyl carbonate, diethyl carbonate and methyl ethyl carbonate. Those may be used alone or as mixtures of two or more thereof.

Specific examples of the lithium salt include $LiPF_6$, $LiBF_4$, $LiClO_4$, $LiCF_3SO_3$ and $LiA_3F_3$. Those may be used alone or as mixtures of two or more thereof.

Other battery constituting elements include a separator, a can (battery case), a gasket and the like. Those can use any materials generally used in a lithium secondary battery, and can constitute a battery by an appropriate combination.

The form of the battery is not particularly limited, and can be any form such as a cylinder shape, a square shape or a coin shape. The form can appropriately be selected according to the specific purpose of use.

EXAMPLES

The present invention is described more specifically below by reference to Examples. Unless otherwise indicated, "%" with regard to an alloy composition and an alloy mixing proportion is "% by mass".

1. Preparation of Negative Electrode Active Material

Example 1

Each raw material was weighed so as to obtain an alloy composition (44.0% Si-48.2% Sn-3.0% Fe-4.8% Cu) as shown in Table 1. Each raw material weighed was heated and melted using a high-frequency induction furnace to obtain a molten alloy. A powdery negative electrode active material according to Example 1 was prepared from the molten alloy obtained above by a gas atomization method. The atmosphere during the preparation of the molten alloy and during the atomization was argon atmosphere. During the gas atomization, an argon gas of high pressure (4 MPa) was jetted to the molten alloy fallen down in a rod state in an atomizing chamber.

The powder obtained was classified into a powder of 25 μm or less using a sieve, and the power thus obtained was used as an active material.

Examples 2 to 28 and 31 to 35

Negative electrode active materials according to Examples 2 to 28 and 31 to 35 were obtained in the same manner as in Example 1 except that each raw material was weighed so as to obtain each alloy composition shown in Tables 1 and 2 (however, in Example 26, classified into a powder of 18 μm or less; in Example 27, classified into a powder of 45 μm or less; and in Example 28, classified into a powder of 75 μm or less).

Example 29

A negative electrode active material according to Example 29 was obtained in the same manner as in Example 1 except that each raw material was weighed so as to obtain each alloy composition shown in Table 2 and a water atomization method was used in place of the gas atomization method. The atmosphere during the water atomization was the air. During the water atomization, water of high pressure (50 MPa) was jetted to the molten alloy fallen down in a rod shape in the atomizing chamber.

Example 30

Each raw material was weighed so as to obtain each alloy composition shown in Table 2. Each raw material weighed was heated and melted using a high-frequency induction furnace to obtain a molten alloy. The molten alloy obtained was quenched by a liquid single roll rapid quenching method to obtain a quenched alloy ribbon. Roll peripheral velocity was 42 m/s, and a nozzle distance was 3 mm. The quenched alloy ribbon obtained was mechanically pulverized using a mortar to obtain a powdery negative electrode active material according to Example 30.

Comparative Example 1

Pure Si powder prepared by a gas atomization method was used as a negative electrode active material according to Comparative Example 1.

Comparative Examples 2 to 4, 6 to 8 and 10 to 14

Negative electrode active materials according to Comparative Examples 2 to 4, 6 to 8 and 10 to 14 were obtained in the same manner as in Example 1 except that each raw material was weighed so as to obtain each alloy composition shown in Table 1.

Comparative Example 5

Each raw material was weight so as to obtain an alloy composition shown in Table 3. The each raw material weighed was heated and melted using a high-frequency induction furnace to prepare a molten alloy. The molten alloy obtained was quenched by a liquid single roll rapid quenching method to obtain a quenched alloy ribbon. Roll peripheral velocity was 42 m/sec and a nozzle distance was 3 mm. The quenched alloy ribbon obtained was mechanically pulverized using a mortar to obtain a powdery negative electrode active material according to Comparative Example 5.

Comparative Example 9

Si powder (prepared by a gas atomization method in Daido Steel Co., Ltd.; average particle size: 18 μm), Sn powder (manufactured by Kojundo Chemical Laboratory Co., Ltd., "SNEO4PB", 38 μm or less), Cu powder (manufactured by Fukuda Metal Foil & Powder Co., Ltd., "Cu-HWQ", 5 μm), and Fe powder (manufactured by Kojundo Chemical Laboratory Co., Ltd., "FEE04PB", 53 μm or less) were prepared. Each raw material was weighed so as to obtain each alloy composition shown in Table 3, placed in a planetary ball mill apparatus (pot material: SUS304, ball material: SUJ2, ball diameter: 6.4 mm), sealed with an Ar gas, and mixed in the number of revolutions of 300 rpm for a mixing time of 30 hours. Thus, a negative electrode active material according to Comparative Example 9 was obtained.

2. Observation of Structure of Negative Electrode Active Material

The structure of each negative electrode active material according to the Examples and the Comparative Examples was observed with a scanning electron microscope (SEM). Furthermore, elemental analysis by an energy dispersion X-ray spectroscopy (EDX) and analysis by XRD (X-ray diffraction) were conducted.

Figure 1:
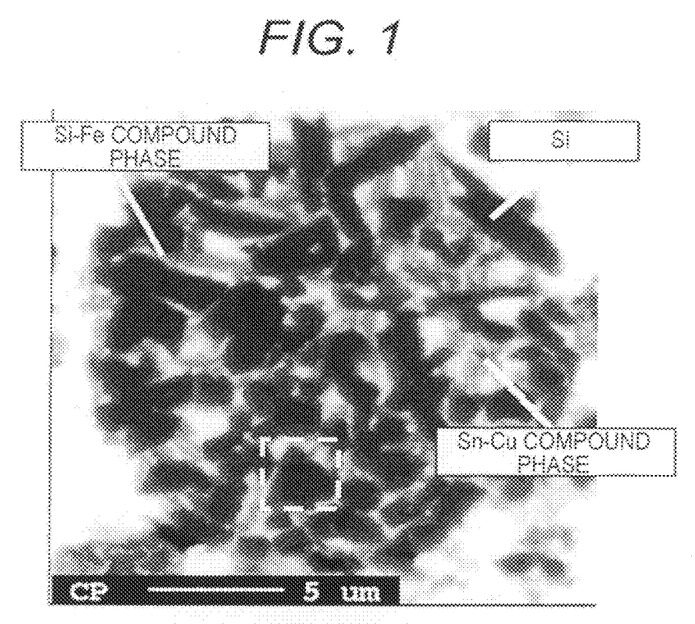
FIG. 1 is a reflected electron image of the negative electrode active material according to Example 4 by a scanning electron microscope (SEM).

Reflected electron image by a scanning electron microscope of the negative electrode active material according to Example 4 is shown in FIG. 1 as the representative example of the negative electrode active material in which Si crystallites are dispersed in an Sn—Cu based alloy matrix and an Si—X based alloy is crystallized in the state of covering the Si crystallites.

Figure 3:
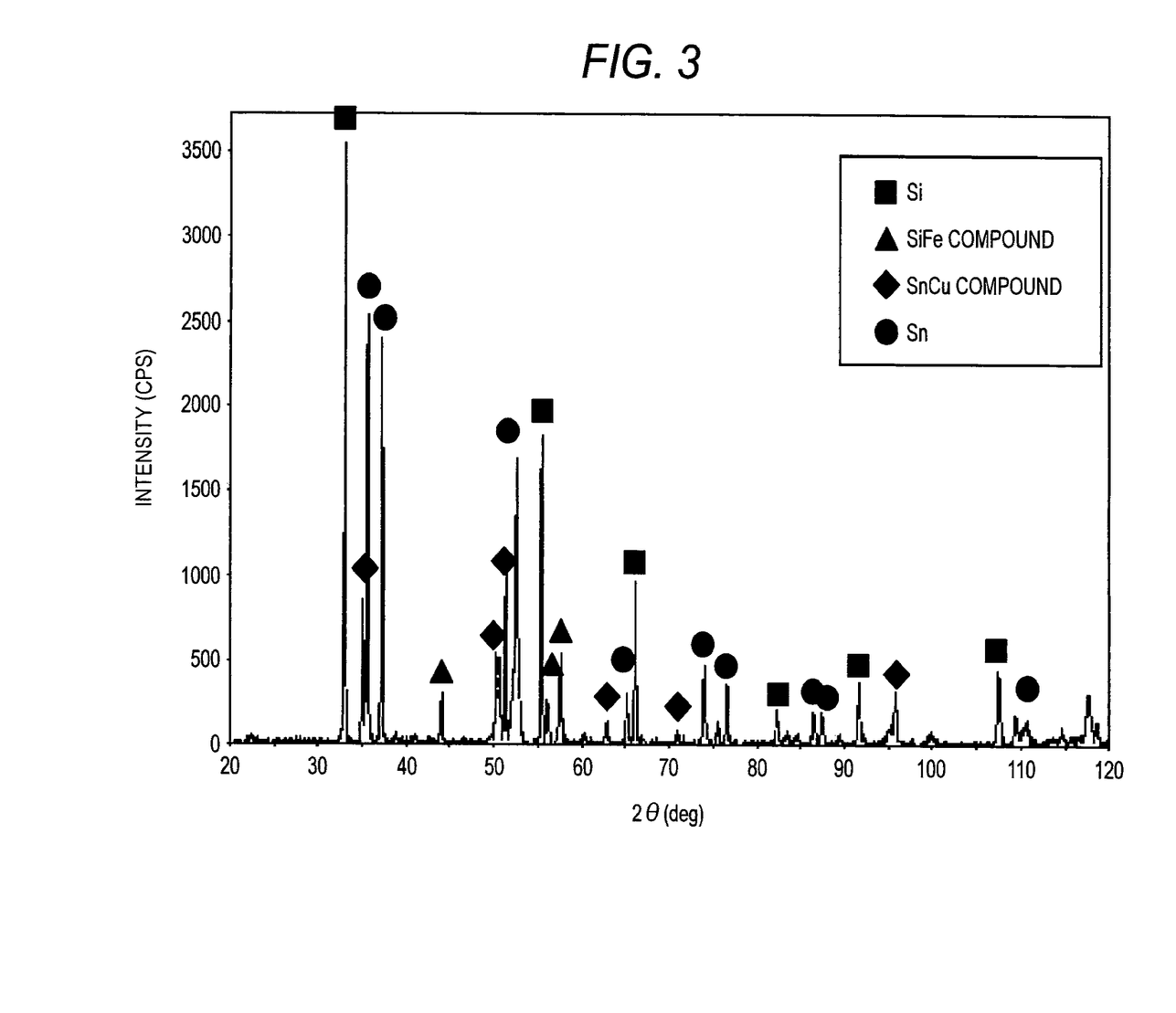
FIG. 3 is a view showing the result by an XRD analysis.

The analysis result by XRD is shown in FIG. 3.

Figure 2:
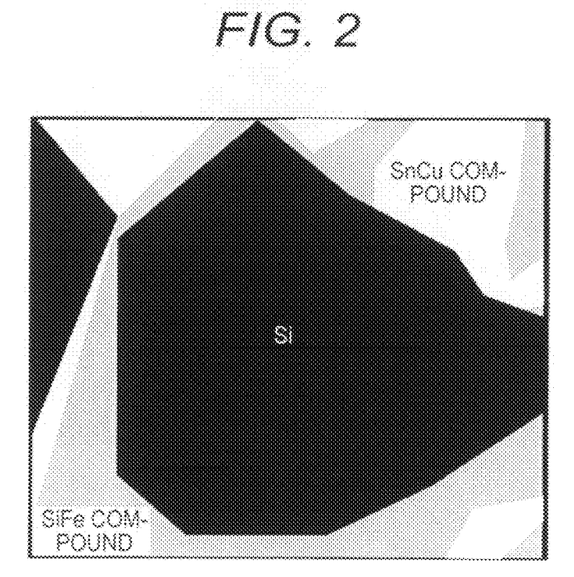
FIG. 2 is an enlarged schematic view of a part of FIG. 1.

FIG. 2 is an enlarged schematic view of a part in FIG. 1 (a portion surrounded by a square frame of a dotted line).

According to the structure observation result by a scanning electron microscope shown in FIG. 1, it was confirmed that the negative electrode active material according to Example 4 has a structure that a lot of Si crystallites are dispersed in the Sn—Cu alloy, and the surfaces of the Si crystallites are partially covered with the Si—Fe alloy. In other words, it was confirmed that the negative electrode active material according to Example 4 has a two-phase matrix structure where the peripheries of fine Si crystallites are partially covered with the Si—Fe alloy, and the peripheries of the Si crystallites are surrounded by the Sn—Cu alloy matrix.

It was confirmed in the result of XRD analysis shown in FIG. 3 that inherent peaks of Si, SiFe compound, SnCu compound and Sn are observed respectively, and phases of those Si, SiFe compound, SnCu compound and Sn are formed in the structure shown in FIG. 1.

The XRD analysis was conducted by measuring the range of an angle of from 120° to 20° at a speed of 20° per minute using a Co tube.

The covering rate of Si crystallites by the Si—X based alloy was obtained in each negative electrode active material.

The term "covering rate" used herein means a proportion of the peripheries of Si particles covered with an Si—X compound in an alloy powder, and a value obtained by dividing a length of a portion contacted between Si phase and Si—X compound phase by a length of the whole circumference of Si particle in a sectional SEM image was used as the covering rate.

Covering rates in ten viewing fields were obtained with respect to one alloy powder composition, and the average value thereof was calculated as the covering rate.

The size of Si crystallite was measured in each negative electrode active material. The size of the Si crystallite is an average value of sizes of Si crystallites measured in optional 20 pieces of Si crystallites on SEM image (one viewing field).

The details of each negative electrode active material prepared are shown in Tables 1 to 3.

TABLE 1

| | | Composition of negative electrode active material (wt %) | | | | | | | Proportion of | Negative electrode active material |
| --- | --- | --- | --- | --- | --- | --- | --- | --- | --- | --- |
| | | | | X | | | | | Sn in Sn—Cu | Particle |
| | | Si | Sn | Fe | Co | Ni | Cu | Al | based alloy (wt %) | diameter (μm) |
| Example | 1 | 44.0 | 48.2 | 3.0 | 0.0 | 0.0 | 4.8 | 0.0 | 61 | <25 μm |
| | 2 | 44.6 | 47.5 | 3.6 | 0.0 | 0.0 | 4.3 | 0.0 | 91 | <25 μm |
| | 3 | 50.0 | 20.5 | 9.0 | 0.0 | 0.0 | 20.5 | 0.0 | 50 | <25 μm |
| | 4 | 50.0 | 25.0 | 9.0 | 0.0 | 0.0 | 16.0 | 0.0 | 61 | <25 μm |
| | 5 | 50.0 | 28.7 | 9.0 | 0.0 | 0.0 | 12.3 | 0.0 | 70 | <25 μm |
| | 6 | 50.0 | 32.8 | 9.0 | 0.0 | 0.0 | 8.2 | 0.0 | 80 | <25 μm |
| | 7 | 50.0 | 36.9 | 9.0 | 0.0 | 0.0 | 4.1 | 0.0 | 90 | <25 μm |
| | 8 | 50.0 | 25.0 | 0.0 | 9.0 | 0.0 | 16.0 | 0.0 | 61 | <25 μm |
| | 9 | 50.0 | 25.0 | 0.0 | 0.0 | 9.0 | 16.0 | 0.0 | 61 | <25 μm |
| | 10 | 35.0 | 31.1 | 14.0 | 0.0 | 0.0 | 19.9 | 0.0 | 61 | <25 μm |
| | 11 | 60.0 | 21.3 | 5.0 | 0.0 | 0.0 | 13.7 | 0.0 | 61 | <25 μm |
| | 12 | 50.0 | 22.0 | 14.0 | 0.0 | 0.0 | 14.0 | 0.0 | 61 | <25 μm |
| | 13 | 60.0 | 18.3 | 10.0 | 0.0 | 0.0 | 11.7 | 0.0 | 61 | <25 μm |
| | 14 | 50.0 | 28.1 | 4.0 | 0.0 | 0.0 | 17.9 | 0.0 | 61 | <25 μm |
| | 15 | 60.0 | 22.6 | 3.0 | 0.0 | 0.0 | 14.4 | 0.0 | 61 | <25 μm |
| | 16 | 60.0 | 21.3 | 0.0 | 5.0 | 0.0 | 13.7 | 0.0 | 61 | <25 μm |
| | 17 | 50.0 | 22.0 | 0.0 | 14.0 | 0.0 | 14.0 | 0.0 | 61 | <25 μm |

| | | Negative electrode active material | | | | |
| --- | --- | --- | --- | --- | --- | --- |
| | | Si crystallite diameter (μm) | Si—X based alloy | Kind of alloy matrix | Covering rate (%) | Production method |
| Example | 1 | 0.8 | Si—Fe alloy | Sn—Cu based alloy | 26 | Gas atomization method |
| | 2 | 0.8 | Si—Fe alloy | Sn—Cu based alloy | 28 | Gas atomization method |
| | 3 | 0.8 | Si—Fe alloy | Sn—Cu based alloy | 34 | Gas atomization method |
| | 4 | 0.9 | Si—Fe alloy | Sn—Cu based alloy | 33 | Gas atomization method |
| | 5 | 0.9 | Si—Fe alloy | Sn—Cu based alloy | 33 | Gas atomization method |
| | 6 | 0.9 | Si—Fe alloy | Sn—Cu based alloy | 34 | Gas atomization method |
| | 7 | 0.9 | Si—Fe alloy | Sn—Cu based alloy | 33 | Gas atomization method |
| | 8 | 0.8 | Si—Co alloy | Sn—Cu based alloy | 34 | Gas atomization method |
| | 9 | 0.7 | Si—Ni alloy | Sn—Cu based alloy | 32 | Gas atomization method |
| | 10 | 0.7 | Si—Fe alloy | Sn—Cu based alloy | 55 | Gas atomization method |
| | 11 | 1.0 | Si—Fe alloy | Sn—Cu based alloy | 27 | Gas atomization method |
| | 12 | 0.8 | Si—Fe alloy | Sn—Cu based alloy | 55 | Gas atomization method |
| | 13 | 0.9 | Si—Fe alloy | Sn—Cu based alloy | 31 | Gas atomization method |

TABLE 1-continued

| | | | | | | |
|---|---|---|---|---|---|---|
| | 14 | 1.0 | Si—Fe alloy | Sn—Cu based alloy | 26 | Gas atomization method |
| | 15 | 1.0 | Si—Fe alloy | Sn—Cu based alloy | 25 | Gas atomization method |
| | 16 | 0.9 | Si—Co alloy | Sn—Cu based alloy | 28 | Gas atomization method |
| | 17 | 0.7 | Si—Co alloy | Sn—Cu based alloy | 57 | Gas atomization method |

(*) In the column of raw material, % of alloy composition and alloy mixing proportion is % by mass.

TABLE 2

| | | Composition of negative electrode active material (wt %) | | | | | | | Proportion of Sn in Sn—Cu based alloy (wt %) | Negative electrode active material Particle diameter (μm) |
|---|---|---|---|---|---|---|---|---|---|---|
| | | Si | Sn | Fe | Co | Ni | Cu | Al | | |
| Example | 18 | 60.0 | 18.3 | 0.0 | 10.0 | 0.0 | 11.7 | 0.0 | 61 | <25 μm |
| | 19 | 50.0 | 28.1 | 0.0 | 4.0 | 0.0 | 17.9 | 0.0 | 61 | <25 μm |
| | 20 | 60.0 | 22.6 | 0.0 | 3.0 | 0.0 | 14.4 | 0.0 | 61 | <25 μm |
| | 21 | 60.0 | 21.3 | 0.0 | 0.0 | 5.0 | 13.7 | 0.0 | 61 | <25 μm |
| | 22 | 50.0 | 22.0 | 0.0 | 0.0 | 14.0 | 14.0 | 0.0 | 61 | <25 μm |
| | 23 | 60.0 | 18.3 | 0.0 | 0.0 | 10.0 | 11.7 | 0.0 | 61 | <25 μm |
| | 24 | 50.0 | 28.1 | 0.0 | 0.0 | 4.0 | 17.9 | 0.0 | 61 | <25 μm |
| | 25 | 60.0 | 22.6 | 0.0 | 0.0 | 3.0 | 14.4 | 0.0 | 61 | <25 μm |
| | 26 | 50.0 | 25.0 | 9.0 | 0.0 | 0.0 | 16.0 | 0.0 | 61 | <18 μm |
| | 27 | 50.0 | 25.0 | 9.0 | 0.0 | 0.0 | 16.0 | 0.0 | 61 | <45 μm |
| | 28 | 50.0 | 25.0 | 9.0 | 0.0 | 0.0 | 16.0 | 0.0 | 61 | <75 μm |
| | 29 | 50.0 | 25.0 | 9.0 | 0.0 | 0.0 | 16.0 | 0.0 | 61 | <25 μm |
| | 30 | 50.0 | 25.0 | 9.0 | 0.0 | 0.0 | 16.0 | 0.0 | 61 | <25 μm |
| | 31 | 50.0 | 25.0 | 4.5 | 0.0 | 4.5 | 16.0 | 0.0 | 61 | <25 μm |
| | 32 | 50.0 | 25.0 | 4.5 | 4.5 | 0.0 | 16.0 | 0.0 | 61 | <25 μm |
| | 33 | 50.0 | 25.0 | 0.0 | 4.5 | 4.5 | 16.0 | 0.0 | 61 | <25 μm |
| | 34 | 50.0 | 27.3 | 4.5 | 0.0 | 0.0 | 18.2 | 0.0 | 61 | <25 μm |
| | 35 | 35.0 | 34.8 | 7.0 | 0.0 | 0.0 | 23.2 | 0.0 | 61 | <25 μm |

| | | Negative electrode active material | | | | |
|---|---|---|---|---|---|---|
| | | Si crystallite diameter (μm) | Si—X based alloy | Kind of alloy matrix | Covering rate (%) | Production method |
| Example | 18 | 0.8 | Si—Co alloy | Sn—Cu based alloy | 33 | Gas atomization method |
| | 19 | 0.9 | Si—Co alloy | Sn—Cu based alloy | 28 | Gas atomization method |
| | 20 | 1.0 | Si—Co alloy | Sn—Cu based alloy | 26 | Gas atomization method |
| | 21 | 0.8 | Si—Ni alloy | Sn—Cu based alloy | 27 | Gas atomization method |
| | 22 | 0.6 | Si—Ni alloy | Sn—Cu based alloy | 54 | Gas atomization method |
| | 23 | 0.7 | Si—Ni alloy | Sn—Cu based alloy | 32 | Gas atomization method |
| | 24 | 0.8 | Si—Ni alloy | Sn—Cu based alloy | 26 | Gas atomization method |
| | 25 | 0.9 | Si—Ni alloy | Sn—Cu based alloy | 34 | Gas atomization method |
| | 26 | 0.9 | Si—Fe alloy | Sn—Cu based alloy | 35 | Gas atomization method |
| | 27 | 0.9 | Si—Fe alloy | Sn—Cu based alloy | 33 | Gas atomization method |
| | 28 | 0.9 | Si—Fe alloy | Sn—Cu based alloy | 34 | Gas atomization method |
| | 29 | 0.7 | Si—Fe alloy | Sn—Cu based alloy | 36 | Water atomization method |
| | 30 | 0.3 | Si—Fe alloy | Sn—Cu based alloy | 31 | Rapid quenching method |
| | 31 | 0.9 | Si—Fe, Si—Ni alloy | Sn—Cu based alloy | 33 | Gas atomization method |
| | 32 | 0.9 | Si—Fe Si—Co alloy | Sn—Cu based alloy | 33 | Gas atomization method |
| | 33 | 0.9 | Si—Ni Si—Co alloy | Sn—Cu based alloy | 35 | Gas atomization method |

TABLE 2-continued

| | | | | | |
|---|---|---|---|---|---|
| 34 | 0.9 | Si—Fe alloy | Sn—Cu based alloy | 15 | Gas atomization method |
| 35 | 0.7 | Si—Fe alloy | Sn—Cu based alloy | 20 | Gas atomization method |

(*) In the column of raw material, % of alloy composition and alloy mixing proportion is % by mass.

TABLE 3

| | | Composition of negative electrode active material (wt %) | | | | | | | Proportion of | Negative electrode active material |
|---|---|---|---|---|---|---|---|---|---|---|
| | | Si | Sn | X | | | | | Sn in Sn—Cu based alloy (wt %) | Particle diameter (μm) |
| | | | | Fe | Co | Ni | Cu | Al | | |
| Comparative Example | 1 | 100.0 | 0.0 | 0.0 | 0.0 | 0.0 | 0.0 | 0.0 | 0 | <25 μm |
| | 2 | 25.0 | 75.0 | 0.0 | 0.0 | 0.0 | 0.0 | 0.0 | 100 | <25 μm |
| | 3 | 50.0 | 50.0 | 0.0 | 0.0 | 0.0 | 0.0 | 0.0 | 100 | <25 μm |
| | 4 | 25.0 | 0.0 | 0.0 | 0.0 | 0.0 | 75.0 | 0.0 | 0 | <25 μm |
| | 5 | 38.0 | 17.0 | 0.0 | 14.0 | 0.0 | 0.0 | 31.0 | 0 | <25 μm |
| | 6 | 50.0 | 41.0 | 9.0 | 0.0 | 0.0 | 0.0 | 0.0 | 100 | <25 μm |
| | 7 | 50.0 | 41.0 | 0.0 | 9.0 | 0.0 | 0.0 | 0.0 | 100 | <25 μm |
| | 8 | 50.0 | 41.0 | 0.0 | 0.0 | 9.0 | 0.0 | 0.0 | 100 | <25 μm |
| | 9 | 50.0 | 25.0 | 0.0 | 0.0 | 9.0 | 16.0 | 0.0 | 61 | <25 μm |
| | 10 | 70.0 | 17.1 | 2.0 | 0.0 | 0.0 | 10.9 | 0.0 | 61 | <25 μm |
| | 11 | 70.0 | 12.2 | 10.0 | 0.0 | 0.0 | 7.8 | 0.0 | 61 | <25 μm |
| | 12 | 10.0 | 51.9 | 5.0 | 0.0 | 0.0 | 33.1 | 0.0 | 61 | <25 μm |
| | 13 | 15.0 | 45.8 | 10.0 | 0.0 | 0.0 | 29.2 | 0.0 | 61 | <25 μm |
| | 14 | 20.0 | 37.8 | 18.0 | 0.0 | 0.0 | 24.2 | 0.0 | 61 | <25 μm |

| | | Negative electrode active material | | | | |
|---|---|---|---|---|---|---|
| | | Si crystallite diameter (μm) | Si—X based alloy | Kind of alloy matrix | Covering rate (%) | Production method |
| Comparative Example | 1 | — | — | — | — | Gas atomization method |
| | 2 | 0.5 | — | Sn | — | Gas atomization method |
| | 3 | 1.0 | — | Sn | — | Gas atomization method |
| | 4 | 1.3 | — | Cu | — | Gas atomization method |
| | 5 | 0.1 | — | Al—Sn—Co alloy | — | Rapid quenching method |
| | 6 | 1.0 | Si—Fe alloy | Sn | 35 | Gas atomization method |
| | 7 | 0.9 | Si—Co alloy | Sn | 36 | Gas atomization method |
| | 8 | 0.9 | Si—Ni alloy | Sn | 36 | Gas atomization method |
| | 9 | 1.0 | — | Si, Sn, Cu, Fe | — | Mechanical alloying method |
| | 10 | 1.2 | Si—Fe alloy | Sn—Cu based alloy | 2 | Gas atomization method |
| | 11 | 1.1 | Si—Fe alloy | Sn—Cu based alloy | 21 | Gas atomization method |
| | 12 | 0.4 | Si—Fe alloy | Sn—Cu based alloy | 86 | Gas atomization method |
| | 13 | 0.5 | Si—Fe alloy | Sn—Cu based alloy | 90 | Gas atomization method |
| | 14 | 0.5 | Si—Fe alloy | Sn—Cu based alloy | 95 | Gas atomization method |

(*) In the column of raw material, % of alloy composition and alloy mixing proportion is % by mass.

3. Evaluation of Negative Electrode Active Material 3.1 Preparation of Coin Type Battery for Charge-discharge Test 100 parts by mass of each negative electrode active material adjusted to have a size of 25 μm or less by classification, 8 parts by mass of acetylene black (manufactured by Denki Kagaku Kogyo Kabushiki Kaisha, d50=36 nm) as a conductive auxiliary agent, 43 parts by mass of graphite (manufactured by Ito Kokuen Co., Ltd.; SG-BH) as an aggregate added as necessary, and 17 parts by mass of polyvinylidene fluoride (PVdF) as a binder were mixed, and the resulting mixture was mixed with N-methyl-2-pyrrolidone (NMP) as a solvent to prepare each paste containing each negative electrode active material.

Each coin type half cell was prepared as follows. For simplified evaluation, an electrode prepared using a negative electrode active material was used as a working electrode, and an Li foil was used as a counter electrode. Each paste was applied to the surface of a copper foil (thickness: 18 μm) as a negative electrode collector in a thickness of 50 μm using a doctor blade method, and dried to form each negative electrode active material layer. After the formation, the negative electrode active material was consolidated by roll press. Thus, working electrodes according the Examples and the Comparative Examples were prepared.

The working electrodes according the Examples and the Comparative Examples were punched into a disk shape having a diameter of 11 mm to obtain each working electrode.

Li foil (thickness: 500 μm) was punched into the nearly same shape as the shape of the working electrode to prepare each positive electrode. $LiPF_6$ was dissolved in a mixed solvent of ethylene carbonate (EC) and diethyl carbonate (DEC) in equal amounts in a concentration of 1 mol/liter to prepare a non-aqueous electrolytic solution.

Each working electrode was placed in each positive electrode can (each working electrode should be a negative electrode in a lithium secondary battery, but when a counter electrode is Li foil, the Li foil is a negative electrode and the working electrode is a positive electrode), the counter electrode was placed in each negative electrode can, and a separator of a polyolefin microporous film was arranged between each working electrode and each counter electrode.

The non-aqueous electrolytic solution was poured in each can, and each genitive electrode can and each positive electrode can were fitted and fixed, respectively.

3.2 Charge-discharge Test

Using each coin type half cell, constant current charge-discharge of a current value of 0.1 mA was performed one cycle, and the discharged capacity was used as initial capacity $C_0$. After second cycle, the charge-discharge test was carried out in 1/5C rate. (C rate: current value which discharges electric quantity $C_0$ required to discharge (charge) an electrode for one hour is 1C. 5C means that (charge) discharge is completed for 12 minutes, and 1/5C means that (charge) discharge is completed for 5 hours.) A value obtained by dividing the capacity (mAh) used during discharge by the mass of an active material (g) was used as each discharged capacity (mAh/g).

In the Examples, the cycle characteristics were evaluated by conducting the charge-discharge cycle 50 times.

Capacity retention (discharged capacity after second cycle/initial discharged capacity (discharged capacity in first cycle)×100, and discharged capacity after 50th cycle/initial discharged capacity (discharged capacity in first cycle)×100) was obtained from the each discharged capacity obtained. The results are shown in Tables 4 and 5.

TABLE 4

| | | Discharged capacity (mAh/g) Initial | Utilization rate of active material to theoretical capacity (%) Target value | Discharged capacity retention (%) | |
|---|---|---|---|---|---|
| | | | | Initial | After second cycle | After 50th cycle |
| | | 800 or more | 50 or more | | 75 or more | 55 or more |
| Example | 1 | 1744 | 75 | 100 | 84 | 74 |
| | 2 | 1805 | 77 | 100 | 83 | 72 |
| | 3 | 1497 | 65 | 100 | 86 | 76 |
| | 4 | 1573 | 67 | 100 | 85 | 75 |
| | 5 | 1621 | 68 | 100 | 83 | 73 |
| | 6 | 1722 | 71 | 100 | 83 | 72 |
| | 7 | 1800 | 73 | 100 | 81 | 70 |
| | 8 | 1620 | 69 | 100 | 85 | 74 |
| | 9 | 1643 | 70 | 100 | 86 | 75 |
| | 10 | 889 | 50 | 100 | 87 | 77 |
| | 11 | 2048 | 75 | 100 | 79 | 66 |
| | 12 | 1414 | 61 | 100 | 88 | 77 |
| | 13 | 1863 | 69 | 100 | 81 | 68 |
| | 14 | 1688 | 71 | 100 | 81 | 72 |
| | 15 | 2195 | 80 | 100 | 77 | 63 |
| | 16 | 2130 | 78 | 100 | 80 | 67 |
| | 17 | 1460 | 63 | 100 | 86 | 78 |
| | 18 | 1917 | 71 | 100 | 80 | 69 |
| | 19 | 1712 | 72 | 100 | 80 | 70 |
| | 20 | 2249 | 82 | 100 | 75 | 62 |
| | 21 | 2157 | 79 | 100 | 80 | 68 |
| | 22 | 1483 | 64 | 100 | 89 | 78 |
| | 23 | 1971 | 73 | 100 | 82 | 70 |
| | 24 | 1736 | 73 | 100 | 82 | 73 |
| | 25 | 2222 | 81 | 100 | 77 | 64 |
| | 26 | 1573 | 67 | 100 | 83 | 72 |
| | 27 | 1385 | 59 | 100 | 82 | 70 |
| | 28 | 1174 | 50 | 100 | 79 | 68 |
| | 29 | 1854 | 79 | 100 | 68 | 55 |
| | 30 | 1643 | 70 | 100 | 88 | 80 |
| | 31 | 1596 | 68 | 100 | 85 | 76 |
| | 32 | 1596 | 68 | 100 | 84 | 74 |
| | 33 | 1620 | 69 | 100 | 85 | 75 |
| | 34 | 1683 | 71 | 100 | 78 | 57 |
| | 35 | 998 | 55 | 100 | 80 | 58 |

(*) In the column of raw material, % of alloy composition and alloy mixing proportion is % by mass.

TABLE 5

|  |  | Discharged capacity | Utilization rate of active material to | Discharged capacity retention (%) | | |
|---|---|---|---|---|---|---|
|  |  | (mAh/g) Initial | theoretical capacity (%) | Initial | After second cycle | After 50th cycle |
|  |  | | Target value | | | |
|  |  | 800 or more | 50 or more | | 75 or more | 55 or more |
| Comparative Example | 1 | 3568 | 85 | 100 | 45 | 5 |
|  | 2 | 1507 | 84 | 100 | 68 | 13 |
|  | 3 | 2128 | 82 | 100 | 54 | 9 |
|  | 4 | 504 | 48 | 100 | 51 | 10 |
|  | 5 | 794 | 45 | 100 | 39 | 45 |
|  | 6 | 1760 | 75 | 100 | 69 | 50 |
|  | 7 | 1737 | 74 | 100 | 71 | 51 |
|  | 8 | 1737 | 74 | 100 | 67 | 49 |
|  | 9 | 2089 | 89 | 100 | 60 | 10 |
|  | 10 | 2549 | 82 | 100 | 48 | 11 |
|  | 11 | 2295 | 75 | 100 | 52 | 15 |
|  | 12 | 178 | 19 | 100 | 88 | 85 |
|  | 13 | 163 | 15 | 100 | 90 | 87 |
|  | 14 | 207 | 17 | 100 | 88 | 84 |

(*) In the column of raw material, % of alloy composition and alloy mixing proportion is % by mass.

The following facts are seen from Tables 4 and 5. The negative electrode active material according to Comparative Example 1 was pure Si, and the utilization rate of the active material to the theoretical capacity was high, but the cycle characteristics were poor. In the negative electrode active materials according to Comparative Examples 2 and 3, the matrix was pure Sn. Therefore, both of pure Si and pure Sn similarly expanded and collapsed, and the cycle characteristics were poor. In the negative electrode active material according to Comparative Example 4, the matrix was pure Cu. The pure Cu does not have Li activity, and therefore, the utilization rate of the active material to the theoretical capacity was low. Additionally, the cycle characteristics were poor. In the negative electrode active material according to Comparative Example 5, the matrix was an Al—Sn—Co alloy. The Al—Sn—Co alloy scarcely has Li activity, and therefore, the utilization rate of the active material to the theoretical capacity was low. The cycle characteristics were improved as compared with other Comparative Examples, but were not yet sufficient. In the negative electrode active materials according to Comparative Examples 6 to 8, the matrix was pure Sn. Therefore, both of pure Si and pure Sn similarly expanded and collapsed, and as a result, the cycle characteristics were poor. However, since the Si—X based alloy was crystallized around the Si crystallites, the cycle characteristics were slightly improved as compared with Comparative Examples 2 to 4, but were not sufficient. The negative electrode active material according to Comparative Example 9 did not pass through a step of melting/crystallization. Therefore, the target matrix structure (two-phase matrix structure) was not obtained, and respective elements were merely mixed. For this reason, the cycle characteristics were poor.

In Comparative Examples 10 and 11, the Si amount was too high exceeding 65% which is the upper limit according to the present invention, and the matrix amount was decreased to that extent. Therefore, the cycle characteristics were poor.

In Comparative Examples 12, 13 and 14, the Si amounts were small as 10.0%, 15.0% and 20.0%, respectively. Therefore, the discharged capacity was low.

On the other hand, in the negative electrode active materials according to Examples 1 to 35, the Si amount was in a range of from 30 to 65% by mass, and thus the initial discharged capacity was high. Furthermore, Si crystallites were dispersed in the Sn—Cu based alloy matrix and additionally, the Si—X based alloy was crystallized in the state of covering the Si crystallites. Therefore, both the improvement in the utilization rate of an active material to the theoretical capacity and the improvement in the cycle characteristics could be achieved simultaneously.

In particular, it was confirmed that the negative electrode active materials according to Examples 1 to 33 in which the covering rate was 25% or more had excellent cycle characteristics as compared with the negative electrode active materials according to Examples 34 and 35 in which the covering rate was less than 25%.

The negative electrode active material for a lithium secondary battery and the negative electrode for a lithium secondary battery according to the present invention are described above. However, the present invention is not limited to the above embodiments and the Examples, and various modifications or changes can be made without departing the spirit and scope of the present invention.

This application is based on Japanese patent application No. 2010-220126 filed Sep. 30, 2010 and Japanese patent application No. 2011-175430 filed Aug. 10, 2011, the entire contents thereof being hereby incorporated by reference.

What is claimed is:

1. A negative electrode active material for a lithium secondary battery, which includes a composition comprising Si in an amount of from 30% to 65% by mass of the negative electrode active material, the negative electrode active material comprising:
   a two phase matrix structure comprising an Sn—Cu based alloy matrix comprising an Sn content of 50% by mass to 95% by mass of the Sn—Cu based alloy matrix;
   Si crystallites dispersed in the Sn—Cu based alloy matrix; and
   an Si—X based alloy crystallized so as to at least partially cover the Si crystallites,
   wherein X is at least one element selected from Fe, Ni, and Co, and is added in an amount from 3% to 15% by mass of the negative electrode active material.

2. The negative electrode active material for a lithium secondary battery according to claim 1, wherein the Si—X based alloy covers the Si crystallites at a covering rate of 25% or more.

3. A negative electrode for a lithium battery, comprising the negative electrode active material for a lithium secondary battery according to claim 1.

4. The negative electrode for a lithium battery according to claim 3, wherein the Si—X based alloy covers the Si crystallites at a covering rate of 25% or more of the negative electrode active material.

5. The negative electrode active material for a lithium secondary battery according to claim 1, wherein the amount of Si of the negative electrode active material is in a range from 40% to 50%.

6. The negative electrode active material for a lithium secondary battery according to claim 1, wherein the Sn content of the Sn—Cu based alloy matrix is 55% by mass or more of the Sn—Cu based alloy matrix.

7. The negative electrode active material for a lithium secondary battery according to claim 1, wherein the Sn content of the Sn—Cu based alloy matrix is 60% by mass or more of the Sn—Cu based alloy matrix.

8. The negative electrode active material for a lithium secondary battery according to claim 1, wherein the Si—X based alloy covers the Si crystallites at a covering rate in a range from 25% to 95%.

9. The negative electrode active material for a lithium secondary battery according to claim 1, wherein the negative electrode active material comprises Si, Sn, Cu, X, and unavoidable impurities.

10. The negative electrode active material for a lithium secondary battery according to claim 9, wherein the negative electrode active material further comprises at least one element selected from the group consisting of Group 2A elements, transition elements, Group 3B elements, and Group 4B elements in a long-period periodic table.

11. The negative electrode active material for a lithium secondary battery according to claim 1, wherein the negative electrode active material consists of Si, Sn, Cu, X, and unavoidable impurities.

12. The negative electrode active material for a lithium secondary battery according to claim 1, wherein the negative electrode active material consists of Si, Sn, Cu, X, at least one element selected from the group consisting of Group 2A elements, transition elements, Group 3B elements and Group 43 elements in a long-period periodic table, and unavoidable impurities.

13. An active material for a lithium battery, the active material comprising:
a two phase matrix structure comprising an Sn—Cu based alloy matrix comprising an Sn content of 50% by mass to 95% by mass of the Sn—Cu based alloy matrix;
Si crystallites dispersed in the Sn—Cu based alloy matrix; and
an Si—X based alloy crystallized that at least partially covers the Si crystallites,
wherein an amount of Si in the active material is in a range from 30% to 65% by mass, and
wherein the amount of the X is from 3% to 15% by mass of the negative electrode active material.

14. The active material according to claim 13, wherein X comprises at least one element selected from Fe, Ni, and Co.

15. The active material according to claim 14, wherein the Si—X based alloy covers the Si crystallites at a covering rate of 25% or more.

16. The active material according to claim 14, wherein the amount of Si of the active material is in a range from 40% to 50% by mass,
wherein the Sn content of the Sn—Cu based alloy matrix is in a range from 60% to 95% of the Sn—Cu based alloy matrix, and
wherein the Si—X based alloy covers the Si crystallites at a covering rate in a range from 25% to 95%.

* * * * *